G. E. MILLER.
FRUIT AND VEGETABLE SLICER.
APPLICATION FILED MAR. 27, 1918.

1,326,082.

Patented Dec. 23, 1919.

Inventor
George E. Miller
By Strong & Townsend
Attorneys

UNITED STATES PATENT OFFICE.

GEORGE E. MILLER, OF SACRAMENTO, CALIFORNIA, ASSIGNOR TO E. CLEMENS HORST CO., OF SAN FRANCISCO, CALIFORNIA, A CORPORATION OF NEW JERSEY.

FRUIT AND VEGETABLE SLICER.

1,326,082.      Specification of Letters Patent.      Patented Dec. 23, 1919.

Application filed March 27, 1918. Serial No. 225,065.

*To all whom it may concern:*

Be it known that I, GEORGE E. MILLER, a citizen of the United States, residing at Sacramento, in the county of Sacramento and State of California, have invented new and useful Improvements in Fruit and Vegetable Slicers, of which the following is a specification.

This invention relates to a vegetable slicer.

It is the principal object of this invention to provide a machine for slicing fruits and vegetables in a manner to prevent them from being bruised in the slicing operation; this machine being, therefore, particularly adapted for preparing fruits and vegetables for drying and thus insuring that the outer surface will be clear and free from discoloration due to bruising.

Another object of this invention is to provide a machine for the above purpose which is simple in its construction and will operate continuously and thoroughly to rapidly slice the material delivered to its cutting elements.

Further objects will appear hereinafter.

The present invention contemplates the use of a series of rotary slicing disks, to which the fruit or vegetables are delivered and by which they are sliced in a manner to produce a shearing cut through the fruit without causing the cutting blades to be forced into the cut.

The invention is illustrated by way of example in the accompanying drawings, in which—

Figure 1:
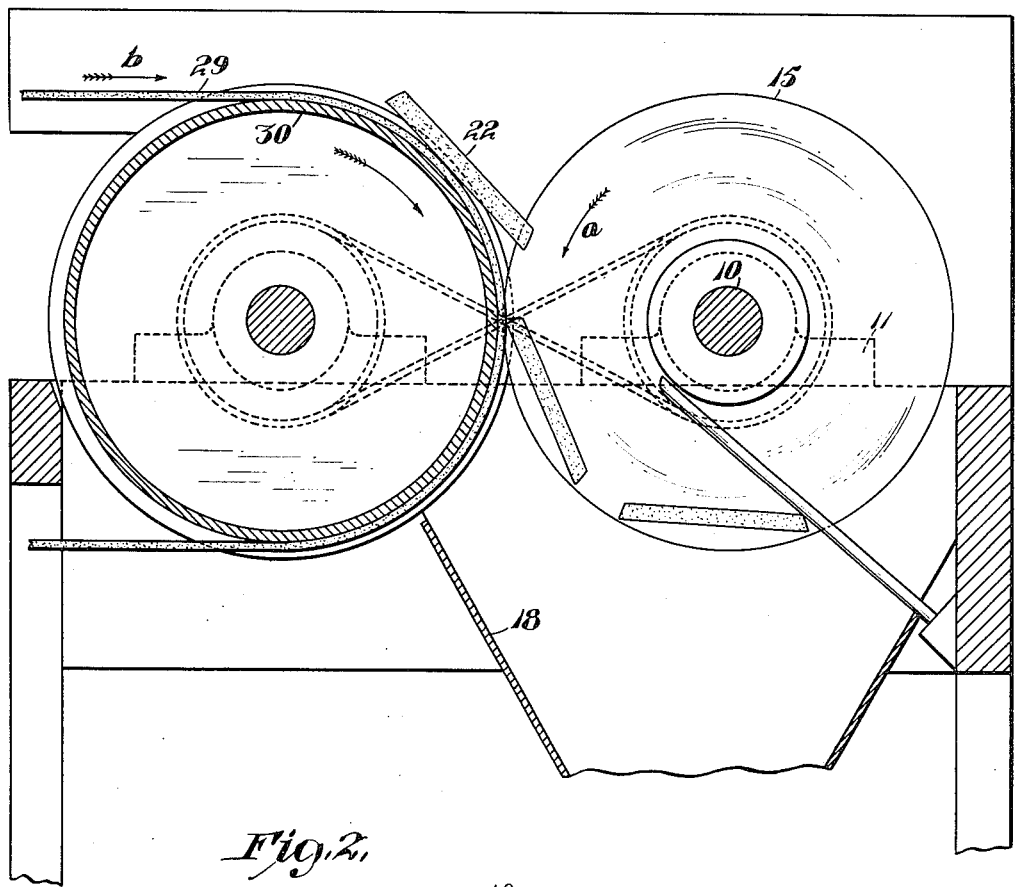
Figure 2:
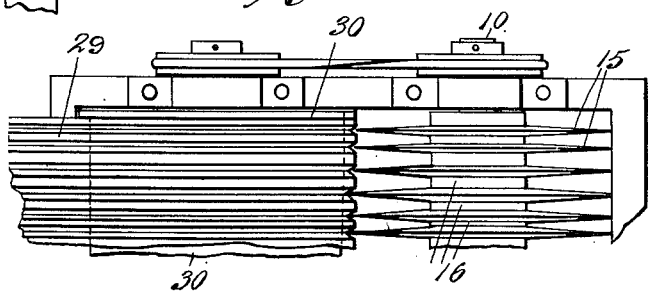

Figure 1 is a view in section and side elevation, illustrating the invention and Fig. 2 is a top plan view on a reduced scale.

Referring more particularly to the drawings, 10 indicates a cylindrical mandrel which is suitably housed at its opposite ends within bearings 11. Mounted upon the mandrel and distributed therealong between the bearings is a series of slicing disks 15. These disks are circular in shape and, as particularly shown in Fig. 2, have a sharpened edge formed with a long beveled face tapering at equal angles from the central plane of the cutter. These disks are held in spaced relation to each other upon the mandrel by spacing collars 16 which will, of course, determine the thickness of the slices to be cut.

Supported by the frame is a lower discharge hopper 18.

The pieces of vegetables or fruit are fed to the cutters 15 by a feed belt 29, the main portion of which extends horizontally and which passes around a cylindrical pulley 30. This pulley is spaced close to the periphery of the cutters 15 and holds the belt so that the cutting edges of the cutters will penetrate the surface of the belt. Suitable flanges are provided at the opposite ends of this pulley to prevent creeping of the belt therealong and thus insuring that the cutters will not mutilate the belt and will only form grooves parallel to each other extending throughout the length of the belt.

In the operation of this device, the pieces of vegetables may be placed in succession along the belt which is traveling in the direction of the arrow *b* and will carry the pieces onto the cutters which are rotating in the direction of the arrow *a* and in opposition to the direction of travel of the vegetables. The continuous movement of the belt and the cutters will gradually feed the pieces of vegetables downwardly and will insure that they are completely severed in a natural manner without the cutting blades being forced through the pulp.

While I have shown the preferred construction of my invention as now known to me, it will be understood that various changes in the construction, combination and arrangement of parts may be made by those skilled in the art without departing from the spirit of the invention as claimed.

Having thus described my invention, what I claim and desire to secure by Letters Patent is—

1. In a vegetable slicing machine, a series of cutting disks, a roller disposed diametrically opposite to said disks, means to rotate the roller and disks, a one-piece fabric belt engaged over said roller and with the peripheries of each of said disks, said belt being formed with a series of spaced grooves which extend but partly through the thickness thereof and which receive the disk peripheries therein and means to hold the belt against lateral movement.

2. In a vegetable slicing machine, a series of spaced cutting disks, a one-piece fabric belt engaged with the peripheries of each of the disks, said belt being formed with a series of spaced grooves which extend but partly through the thickness thereof and which receive the disk peripheries therein, and means to prevent lateral movement of the belt.

In testimony whereof I have hereunto set my hand in the presence of two subscribing witnesses.

GEORGE E. MILLER.

Witnesses:
JOHN H. HERRING,
W. W. HEALEY.